United States Patent
Von Kulmer

[15] 3,705,435
[45] Dec. 12, 1972

[54] APPARATUS FOR WASHING VEHICLES

[72] Inventor: Ulrich Von Kulmer, Friedberg, Germany

[73] Assignee: Maschinenfabrik Kleindienst & Co., Augsburg, Germany

[22] Filed: Sept. 16, 1970

[21] Appl. No.: 72,719

[30] Foreign Application Priority Data

Dec. 15, 1969 Germany..........P 19 62 818.3

[52] U.S. Cl.............15/21 R, 15/DIG. 2, 15/97, 15/302, 15/340, 15/359, 15/393
[51] Int. Cl..............................................B60s 3/04
[58] Field of Search..........15/DIG. 2, 21 D, 21 E, 53, 15/97 R, 301, 302, 340, 363, 359, 379, 393

[56] References Cited

UNITED STATES PATENTS

| | | | |
|---|---|---|---|
| 1,621,909 | 3/1927 | Smith | 15/363 UX |
| 2,637,873 | 5/1953 | Berezny | 15/379 X |
| 3,510,898 | 5/1970 | Tatara et al. | 15/DIG. 2 |

*Primary Examiner*—Edward L. Roberts
*Attorney*—Karl F. Ross

[57] ABSTRACT

A method of, and apparatus for, washing cars and other vehicles involves the use of relatively soft bristles which are pressed on to the vehicle surface by means of compressed air jets conducted along the bristles which also serve to dry the vehicle. The bristles which may be in groups are suitably mounted on axes substantially at right angles to the surface of the vehicle.

8 Claims, 7 Drawing Figures

INVENTOR
Ulrich von KÜLMER

BY

Karl F. Ross
Attorney

APPARATUS FOR WASHING VEHICLES

FIELD OF THE INVENTION

The invention relates to an apparatus for washing vehicles, particularly passenger cars, in which the surface of the vehicle is washed during a relative movement between the vehicle and cleaning apparatus by means of a liquid detergent and washing elements provided with bristles or the like, and in which the surface of the vehicle is dried by means of compressed air.

BACKGROUND OF THE INVENTION

It is known to clean vehicles by pressing brushes, capable of rotating and provided with bristles, during a relative movement between the vehicle and the cleaning apparatus against the surface of the vehicle and by spraying the vehicles with water. In this method, the bristles are erected to a radially upright position by the centrifugal force and thus substantially stiffened. In order to achieve this effect, the brushes have to be driven at a considerable rotational speed with the resultant disadvantages of the automobile-coating lacquer being damaged to a significant extent by the substantially stiffened brushes. This has a particularly detrimental effect upon brand-new cars. The known construction has, moreover, to be provided with brushes of a substantial diameter with the result that the washing apparatus possesses large overall dimensions. The washing apparatus will be further enlarged and thus require a considerable amount of space where the washed vehicle is, in addition, to be dried, for example by means of separate compressed-air installations, or by compressed-air installations combined with the washing apparatus.

OBJECT OF THE INVENTION

It is thus an object of the invention to develop a new system for washing vehicles, particularly motor cars, in which the risk of damage is reduced and in which, moreover, the overall dimensions and thus the space requirements are substantially reduced, and the washing apparatus may thus also be installed in smaller spaces frequently available in filling stations.

SUMMARY OF THE INVENTION

To achieve this object, the invention proceeds from known installations provided with bristle-carrying washing elements and a compressed-air installation. The following description is directed solely to the use of bristles. In accordance with the invention, cleaning elements other than bristles, for example pieces of string, strips of plastic foam or the like may, however, also be used.

The essence of the invention consists of the bristles being pressed during the washing operation against the surface of the vehicle by means of an air current conducted along the bristles. The air current is advantageously conducted predominantly along the periphery of the groups of bristles. It proves to be particularly advantageous for the washing elements carrying or containing the bristles to rotate about axes extending substantially at right angles to the vehicle surface to be cleaned.

The application of the apparatus according to the invention results in surprising advantages being obtained. First of all, the invention departs entirely from the conventional brushes whose axes extend parallel to the vehicle surface to be cleaned.

In accordance with the invention, bristle assemblies of a different kind are used which are, of themselves, not readily capable of cleaning the surface of a vehicle, since their bristles are considerably less stiff than those used in the known constructions. In accordance with the invention, a specifically directed air current, which becomes effective during the washing operation, is provided for pressing the bristles nevertheless against the surface of the vehicle to produce a satisfactory cleaning effect. By conducting the compressed air along the bristles, the bristles are pressed against the surface of the vehicle by an adequate force and, in addition, the application of the cleaning liquid to the surface of the vehicle is accelerated, such acceleration combined with the action of the bristles producing an improved washing effect. The fact that in the construction according to the invention the working distance is considerably shortened affords particular advantages, since the combination of washing element and compressed-air installation may be of small dimensions and the space required by the washing apparatus thus exceeds only slightly the space occupied by the largest vehicle to be washed. This results, finally, in the advantage of the manufacturing costs being considerably reduced. The operating costs are also reduced, since considerably smaller masses have to be moved.

In one suitable apparatus for carrying out the method according to the invention, the bristle-carrying washing elements and the compressed-air installation are combined in a common structural unit, and the orifice of the compressed-air installation is so positioned as to ensure that, during the washing operation, the compressed air is conducted along the bristles.

It is thus a fundamentally new feature of the invention that compressed air is effective during the washing operation and thus assists the washing operation. The compressed air may, however, also be effective solely during a separate drying process, it being then advantageous for the washing installation to be rendered inoperative by suitable means.

In accordance with the invention, the washed vehicle may even be dried without it being necessary for the washing apparatus to be disengaged from the surface of the vehicle. Any moisture between the bristles is very quickly removed and blown away as a result of the specific conduction of the compressed air. The previously dried bristles thus act as wiping elements by which the liquid present on the vehicle is pushed away with the assistance of the compressed air acting in parallel therewith. Thus, upon application of the apparatus according to the invention, the drying process, also, produces considerably better results than before.

The orifice of the compressed-air installation is advantageously so positioned as to enclose the bristle-carrying element at least at the end remote from the vehicle, so that it is ensured that the air current moves also or predominatly along the periphery of the bristles. As a result of the bristles being enclosed, as it were, by the compressed-air current, the bristles are combined in bundles which, of themselves have, owing to their softness, a tendency to yield to the resistance as a result of the centrifugal force or as a result of contacting the surface of the vehicle. It will be understood that the compressed air may also be conducted through the gaps between the individual bristles.

It is a specific feature of the invention that the washing elements carrying or containing the bristles are mounted on shafts extending at substantially right angles to the vehicle surface to be cleaned. The washing elements may consist of rotating belts, chains or similar supports to which the bristles are secured in such manner as to be directed towards the surface of the vehicle in any position. This construction is, of itself, novel and particularly advantageous as compared with the known washing installations, since a condiderably smaller number of bristles and a considerably smaller number of rotating masses. This is due to the fact that in this construction of apparatus according to the invention, all of the bristles engage the surface of the vehicle. In the known rotating brushes, only a small number of the total of bristles act momentarily upon the surface of the vehicle, while the remaining bristles have a tendency to splash the liquid present thereon outwardly, it being thus impossible for persons to be in direct vicinity of the washing apparatus. In accordance with the invention, this disadvantage is avoided.

Since, in accordance with the invention, the contact pressure applied by the bristles is assisted by the compressed air, bristles which are considerably softer than the bristles of the known rotary brushes, may now be provided, and the danger of the lacquer being damaged is substantially reduced.

In accordance with the invention, it is also possible for the supply of cleaning liquid to the washing elements to be directed substantially along the bristles. In the known installations, the cleaning liquid had to be sprayed either on the rotating brushes or directly on to the surface of the vehicle, and a considerable proportion of the liquid was thus lost as a result of centrifugal action. In accordance with the invention, the liquid may be conveyed from the inside along the bristles to the vehicle without the application of considerable pressure. The effect is similar to that of a sponge moved manually over the surface of the vehicle without damaging it.

In one construction according to the invention, the structural unit comprising the washing element and its associated compresses-air installation is vertically adjustable by means of a support on a vertical elevator of known construction provided on the portal enclosing the vehicle. The vertical adjustment of the support or of the structural unit may be brought about by various known means. When the bristles acting upon the surface of the vehicle have a determined stiffness, the resulting known climbing action of the washing elements may be utilized for moving the support of the structural unit with climbing motion along the surface of the vehicle. However, other control means, such as contour-feelers, torque-controlling devices, or other known devices may be used for maintaining the washing apparatus at a constant distance from the vehicle surface to be cleaned. Devices of this kind are known, and a differentiated description thereof may thus be dispensed with.

In this connection, it is, however, advisable to provide the structural unit or its support of a construction enabling it to be rotatable about a horizontal axis, so that the structural unit may act upon the top surfaces as well as upon the end faces of the vehicle. A rotatable construction is to be recommended, if only for the reason of preventing rigid elements of the structural unit from striking against the vehicle when the washing elements treating the roof area of the vehicle have necessarily to be tilted in order to enable them to move across the front or rear window to the surface of the radiator or to the rear surface of the vehicle. The rotational movement of the structural unit affords, however, particular advantages where it is desired to treat the front and rear faces of the vehicle with the washing apparatus actually intended for treating the roof. In such cases it is particularly advantageous to provide the structural unit on a travelling portal reciprocated along the stationary vehicle. Since the space required by the structural unit according to the invention virtually does not exceed the space required by the actual portal, the overall dimensions are considerably reduced and the required length of the working stroke is thus composed of the length of the largest vehicle to be washed plus twice the length of the column of a portal.

In an alternative construction according to the invention, those ends of the bristles that are remote from the vehicle are secured to a rotating disc which is enclosed by the orifice of the compressed-air installation. The bristles are bundled to form a cylinder enclosed by a hollow cylindrical air current. A construction of this kind is particularly suitable for cleaning the wheel rims of the vehicle and for cleaning the end faces, particularly the radiator grille of a vehicle.

In this connection, the invention discloses an independent embodiment, in which the compressed-air installation is provided adjacent the washing element. The washing element in this construction may comprise a plurality of parallel, disc-shaped brushes which may be provided in staggered relation and the axes of which extend in parallel with the longitudinal axis of the vehicle. In this construction, the compressed-air current need not necessarily intensify the contact pressure applied by the individual bristles to the surface of the vehicle, since the bristles apply a considerable pressure in any case as a result of their rotational movement. This construction has, however, the advantage over the known constructions that the individual disc-shaped brushes have a considerably shorter length then the known brushes and from a constructional unit with the compressed-air installation with the result that the advantage obtained is equal to the advantage afforded by the remaining constructions according to the invention, by which an intensive washing treatment including a drying of the surface of the vehicle can be carried out in the minimum of space.

In all constructions, the drive of the washing element constructions, be stopped independently of the compressed-air installation and during the drying process the bristles may be allowed to slide along the vehicle, without moving themselves, or to swing away from the vehicle. The apparatus according to the invention may thus be guided along the vehicle both during the washing operation and during the drying process, and both elements forming the structural unit may be caused to operate either collectively or individually.

DESCRIPTION OF THE DRAWING

These features and further features of the invention are diagrammatically illustrated by way of example in the accompanying drawing, in which.

SPECIFIC DESCRIPTION

Figure 1:
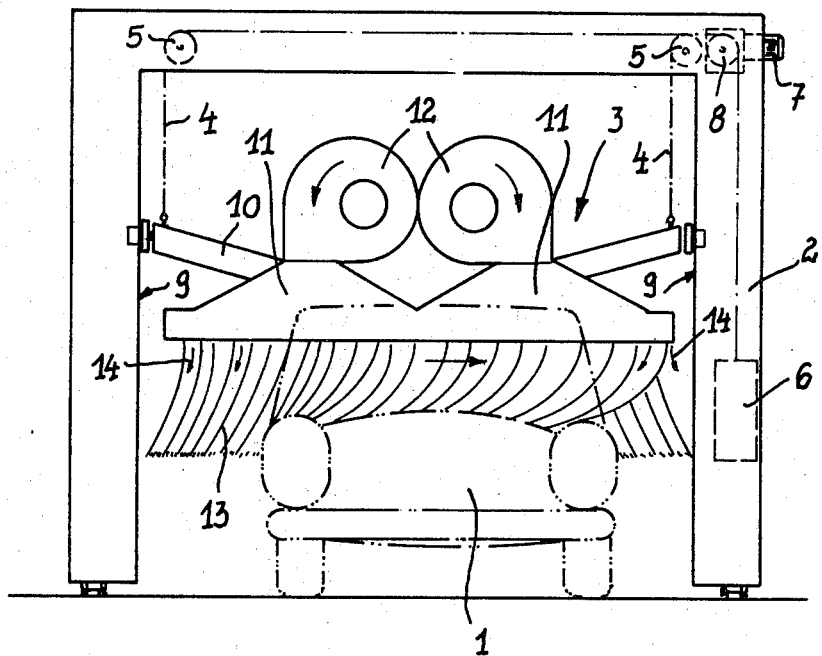
FIG. 1 shows a front elevation of washing apparatus according to the invention, in which one of the washing elements is treating the surface of a vehicle.

The embodiment shown in FIG. 1 shows a front view of a so-called portal design, in which the washing apparatus is reciprocated along a stationary vehicle 1. The invention is, however, not limited to this form of motion, it includes any other form of motion, for example a "washing road or train," in which the vehicle is moved along stationary washing devices. The washing apparatus according to the invention may also be moved around the stationary vehicle along a closed or open path of motion.

A structural unit 3 is vertically adjustable on a portal 2. The conventional tackles 4 and guide pulleys 5 with counter-weights 6 are used for this purpose, the tackle 4 acting through a driving pulley 8 upon a lifting motor 7 actuated by a suitable known control device whenever the distance of the structural unit 3 from the surface of the vehicle is less than a determined amount. The counter-weight 6 is so dimensioned that the structural unit 3 is slightly top-heavy and thus capable of descending automatically to a lower working position.

The structural unit 3 is mounted on a support 10 which is guided in the vertical direction in a suitable guide 9 provided on the column. The structural unit 3 may, however, also be mounted on swivel arms so as to be vertically adjustable.

The structural unit 3 comprises essentially a washing element 13 and a compressed-air installation 11 provided with blowers 12, the particular point of the invention being that the flow of air is conducted along the bristles of the washing element 13 as indicated by the arrow 14, thus pressing the bristles against the surface of the vehicle. In the construction illustrated in FIG. 1, the bristles are moved horizontally across the surface of the vehicle. For this purpose, the bristles may be secured to a rotating belt, (not shown in FIG. 1), which is guided within the compressed-air installation 11. It will also be noted from FIG. 1 that the transversely moving, downwardly hanging bristles slide across the surface of the vehicle as they are simultaneously pressed by the compressed air against the surface of the vehicle. A cleaning liquid may simultaneously be conveyed along the bristles to the surface of the vehicle without the risk of the liquid being splashed about unnecessarily.

Figures 2, 3:
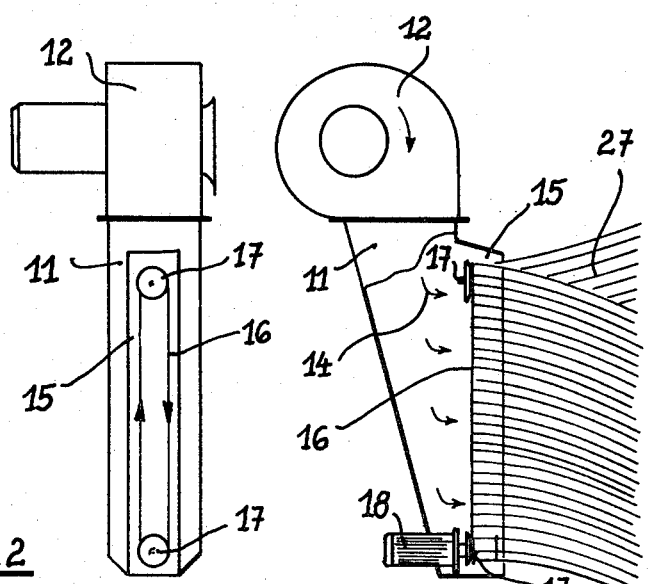
FIGS. 2 and 3 are respectively a side elevation and a longitudinal section of washing apparatus for carrying out treatment of the sides.

The construction illustrated in FIGS. 2 and 3 show respectively a front elevation and a longitudinal section of the coordination between the washing elements 13 and the compressed-air installation 11 in washing apparatus treating the sides of the vehicle.

It will be noted in FIG. 2 that a rotating belt 16 guided over guide pulleys 17 and carrying the bristles 27 of a washing element 13 is provided within the air outlet 15 of the compressed-air device 11. The belt 16 is driven comparatively slowly by a driving motor 18. The air current indicated by the arrow 14 encloses the bristles 27 and, in addition, passes through the gaps between them so that the bristles are unable to yield laterally to any substantial extent or to bend aside under their own gravity.

As stated previously, a construction of this kind may be used for cleaning the surfaces and the sides and end faces of the vehicle.

Figure 4:
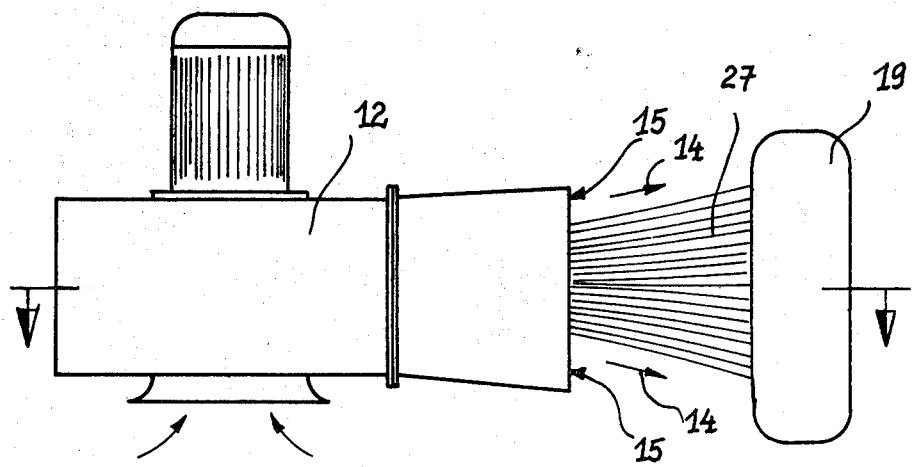
FIGS. 4 and 5 are respectively a plan view and a longitudinal section of washing apparatus for use in process of treating the wheel rims of the vehicle.
Figure 5:
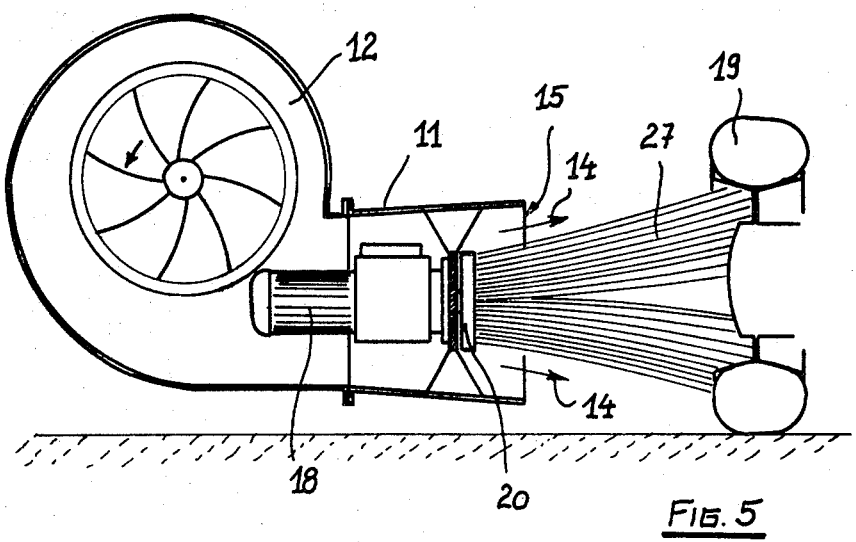

A special construction which is essentially suitable for cleaning the wheel rims of motor cars with greater efficiency than has hitherto been possible, is shown diagrammatically by way of example in FIGS. 4 and 5. In this construction, these ends of the bristles 27 that are remote from the vehicle are connected to a disc 20 rotated by a driving motor 18. The disc 20 is mounted substantially concentrically in an outlet 15 of the compressed-air device 11 which is connected to a blower 12 so that the air current indicated by the arrow 14 encloses the rotating bristles 27. As a result of the rotation, the bristles tend to spread under the action of the centrifugal force. This tendency counteracts the enclosing air current, and the rims of the wheel 19 can thus be satisfactorily cleaned in all positions. It will be understood that constructions of this kind may also be used for cleaning other parts, for example the end faces, of a vehicle.

Figure 6:
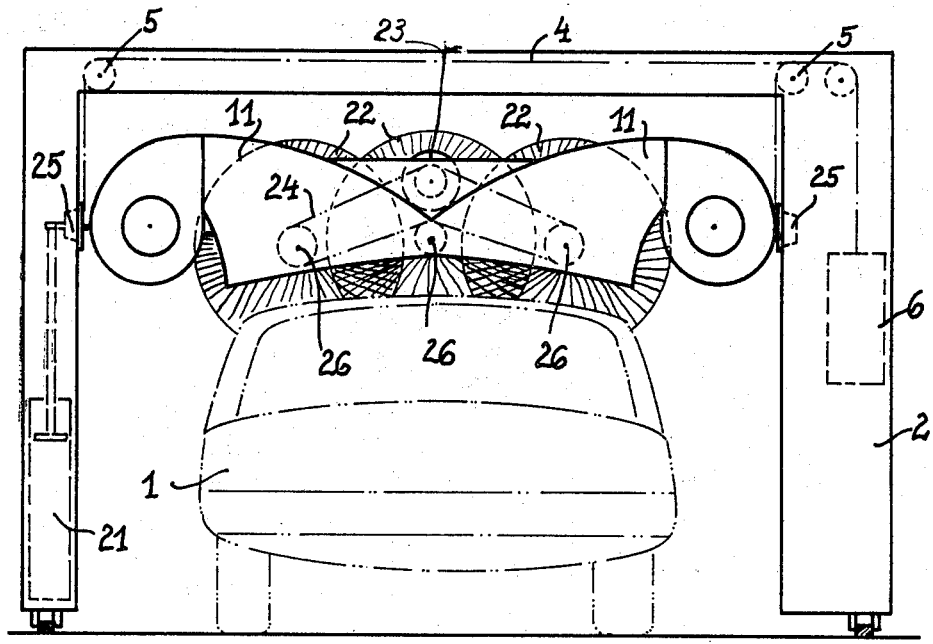
FIGS. 6 and 7 show respectively a front elevation and a side elevation of a modified construction of the washing apparatus illustrated in FIG. 1.
Figure 7:
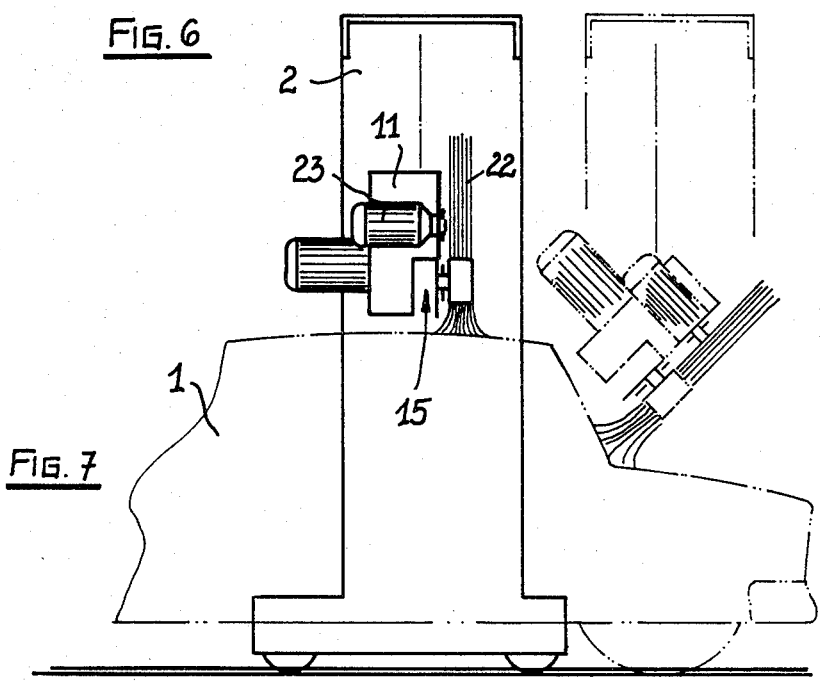

Finally, the construction illustrated in FIGS. 6 and 7 is an independent modification of the invention, in which the compressed air does not necessarily have to be conducted along the bristles and thus also does not play a contributory role in pressing the bristles against the surface of the vehicle.

In this construction, the washing elements 13 consist of short disc-shaped brushes 22 which rotate about axes 26 extending parallel to the longitudinal axis of the vehicle and driven collectively by the driving motor 23 through a chain drive 24. As shown clearly in FIG. 7, the air outlet 15 is disposed adjacent the disc-shaped brushes 22, however, the disc-shaped brushes 22 and the compressed-air installation 11 still form a physical structural unit which is preferably movable elevator fashion in the column of a portal 2. In this embodiment, the lifting motor 21 is provided in the form of a pneumatic or hydraulic cylinder which may be mounted in one of the columns at a concealed position.

In this construction, the whole structural unit 11, 22 is mounted so as to be rotatable, for example in swivel bearings 25 of the guide. The structural unit can thus be moved to a suitable tilted position shown in dash-dot lines in FIG. 7, for the treatment of the end faces and surfaces of a vehicle. Any optional control device ensuring that the structural unit remains always at a determined minimum distance from the surface of the vehicle may be used for this purpose.

In this construction also, the compressed air may become effective as the disc-shaped brushes 22 act upon the surface of the vehicle, and it may then be advisable during the washing operation to provide the air outlet 15 behind the disc-shaped brush 22, so that the cleaning and drying processes may proceed in one operation. Where the washing apparatus according to the invention is to be moved backwards along the stationary vehicle, the disc-shaped brushes 22 may be stopped without being removed from the surface of the vehicle. Since the compressed-air installation 11 is effective along this path, the bristles perform a certain wiping action simulating the effect of chamois leather to remove residues of liquid still present on the surface of the vehicle. However, it is also possible to disengage the disc-shaped brushes 22 from the surface of the vehicle for the duration of the drying process, for example by swinging them away from the compressed-air installation 11. Then the compressed air alone is effective to blow the liquid off the surface of the vehicle.

We claim:
1. An apparatus for washing a vehicle, comprising:
a support displaceable relative to the vehicle to be washed;
a blower installation mounted on said support and having a housing defining a path for compressed air and terminating in an opening through which the compressed air is trained upon said vehicle;
a brush mounted in said housing and having bristles extending therefrom through said opening with clearance generally along the path of the compressed air emerging from said opening for deflection by the compressed air; and
means in said housing for rotating said brush and displacing said bristles along a closed path.

2. The apparatus defined in claim 1 wherein said brush has an axis surrounded by said path and around which the same is rotated, said axis extending substantially at right angle to the surface of said vehicle.

3. The apparatus defined in claim 1 wherein said brush comprises an endless flexible belt carrying said bristles and guided in an elongated path within said opening, said opening being formed as a slot.

4. The apparatus defined in claim 1 further comprising means for supplying a cleaning agent to the bristles of said brush substantially therealong.

5. The apparatus defined in claim 1 further comprising means for mounting said installation for vertical displacement on said support, said support being constituted as a portal frame.

6. The apparatus defined in claim 1 further comprising means for mounting said blower installation upon said support for angular displacement about a horizontal axis.

7. The apparatus defined in claim 1 wherein said brush comprises a disk in said housing, said bristles being secured to a face of said disk at one end thereof.

8. The apparatus defined in claim 1 wherein said brush forms one of a plurality of parallel disk-shaped brushes in staggered relationship and with axes parallel to the longitudinal axis of the vehicle.

* * * * *